United States Patent [19]

Iskarous et al.

[11] Patent Number: 5,285,381
[45] Date of Patent: Feb. 8, 1994

[54] MULTIPLE CONTROL-POINT CONTROL SYSTEM AND METHOD OF USE

[75] Inventors: Moenes Iskarous; Kazuhiko Kawamura, both of Nashville, Tenn.

[73] Assignee: Vanderbilt University, Nashville, Tenn.

[21] Appl. No.: 942,757

[22] Filed: Sep. 9, 1992

[51] Int. Cl.⁵ .......................... G05B 9/02; G06F 11/00
[52] U.S. Cl. ........................................ 364/187; 371/9.1
[58] Field of Search ............................ 364/184–187, 364/131–139; 395/275, 575; 371/8.1, 9.1, 11.1

[56] References Cited

U.S. PATENT DOCUMENTS

| | | | |
|---|---|---|---|
| 4,392,199 | 7/1983 | Schmitter et al. | 371/11.1 |
| 4,438,494 | 3/1984 | Budde et al. | 371/11.1 |
| 4,442,502 | 4/1984 | Friend et al. | 371/9 |
| 4,622,667 | 11/1986 | Yount | 371/9 |

Primary Examiner—Jerry Smith
Assistant Examiner—Jim Trammell
Attorney, Agent, or Firm—Needle & Rosenberg

[57] ABSTRACT

A control system for rapid fault tolerant control of a multiple control-point apparatus is disclosed. The system comprises: a host subsystem acting as a user interface; a plurality of control-point actuators; a master controller subsystem which receives initialization data from the host terminal and which generates behavior commands; and a control-point controller subsystem which receives behavior commands from the master controller subsystem and generates control-point actuator commands. The control-point controller subsystem is made fault tolerant by using a plurality of control-point processors connected to control-point interfaces through a programmable crossbar switch such that if any of the control-point processors develops a fault, the crossbar switch will connect one of the other control-point processors to the control-point interface previously serviced by the faulty control-point processors. The master controller subsystem can be made fault tolerant by including an odd number of at least three master processors in the master controller subsystem such that each master processor runs a common control program in parallel with every other master processor and the master control output for each master processor is compared with the other master control outputs to generate the output common to the majority of master processors as the majority control output.

16 Claims, 1 Drawing Sheet

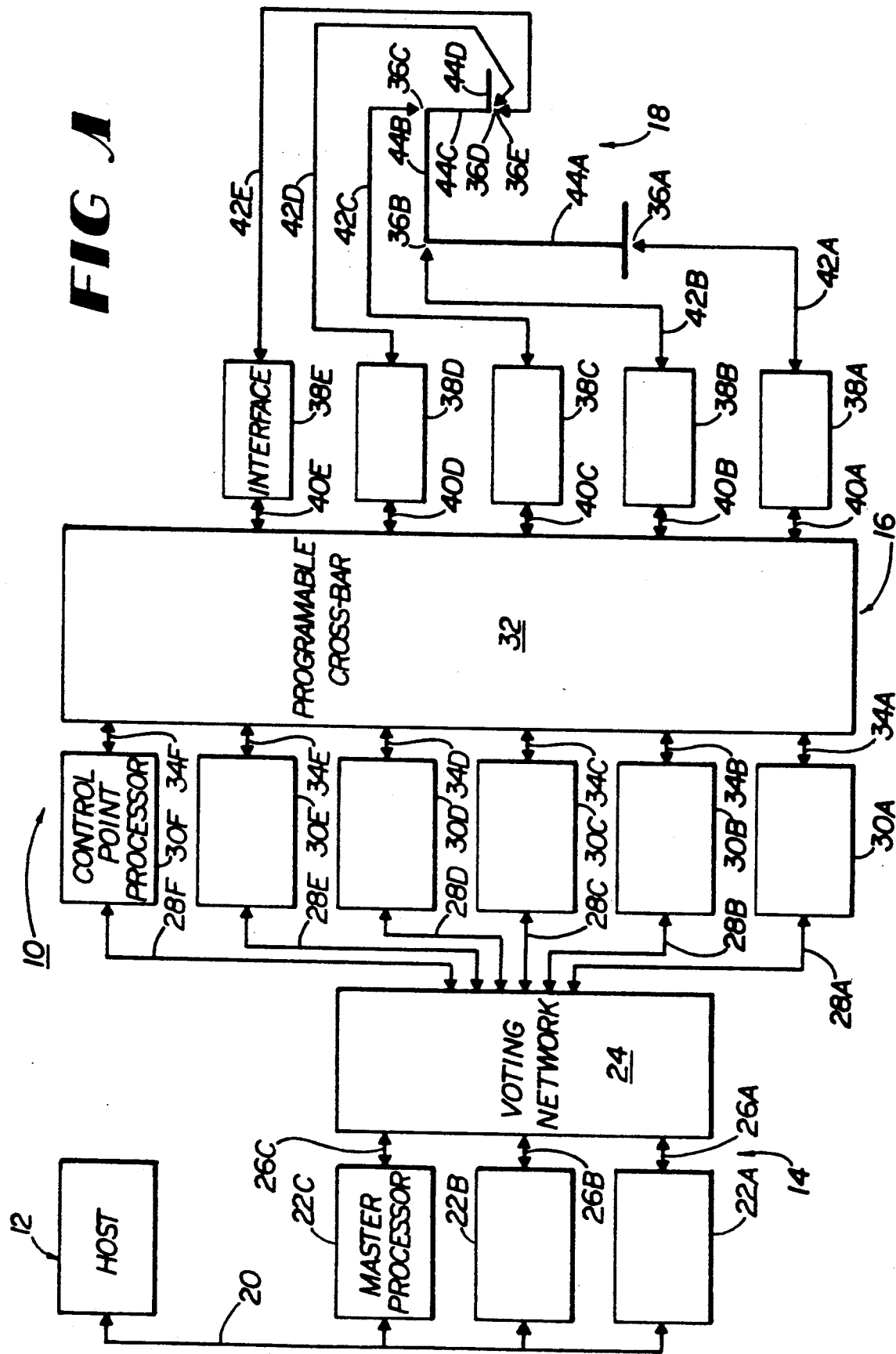

MULTIPLE CONTROL-POINT CONTROL SYSTEM AND METHOD OF USE

BACKGROUND OF THE INVENTION

This invention relates to a fault tolerant device for controlling a multiple control-point apparatus, such as a robot arm. More particularly, this invention relates to a fault tolerant control system in which redundant processors are used to replace faulty processors.

A multiple control-point apparatus is a device which completes a task as a result of a plurality of independent operations taking place simulataneously. A good example of a multiple control-point apparatus would be a multi-jointed robot arm. For a robot arm to complete a task, its controller must simultaneously generate separate commands for each of its joints. For example, to complete the task of picking up an object, a robot arm controller might have to simultaneously cause a shoulder-like joint to laterally rotate in the direction of the object, cause an elbow-like joint to extend toward the object, and cause a hand-like joint to grasp the object.

Heretofore, various devices for controlling multiple control-point control systems have been developed. See, for example: ACFAS Robot System, *Rubbertuators and Applications for Robots*, Technical Guide No. 1, Bridgestone Corporation, 1986; Bagchi, S. and K. Kawamura, *A Distributed Object-Oriented Robotic System*, presented at the 1992 International Conference on Intelligent Robots and Systems (IROS '92), July 1992; Kara, A., S. Bagchi, S. Chawla, M. Iskarous, and K. Kawamura, *Intelligent Control of a Robotic Aid System for the Physically Disabled*, Proceedings of the IEEE International Symposium on Intelligent Control, pp. 359-364, Arlington, VA. Aug. 1991; and Craig, J. J., *Introduction To Robotics Mechanics and Control*, Addison-Wesley Publishing Company, Inc., 2$^{nd}$ edition, 1986.

A significant problem with many multiple control-point controllers is their susceptibility to faults. If one of the control-point controllers becomes inoperative, such as as a result of an electronic fault or a software bug, the entire apparatus may be rendered useless. With an inaccesible apparatus (such as a robotic apparatus employed on a satellite) or a life-critical apparatus (such as a robot used in the care of the handicapped), the cost of the failure of just one control-point controller can be devastating. The instant invention solves this deficiency by providing a multiple control-point controller that is robust with respect to control-point controller failures.

Throughout this application, various publications are referenced. The disclosures of these publications in their entireties are hereby incorporated by reference into this application in order to more fully describe the state of the art to which this invention pertains.

SUMMARY OF THE INVENTION

This invention relates to a control system, and a method of using the control system, which increases the reliability of a multiple control-point apparatus controller by adding fault tolerance features to the system.

In particular, this invention relates to a host system; a master controller subsystem; a control-point controller subsystem; and a multiple control-point apparatus, which is controlled through a plurality of control points. The host system downloads initialization data, such as operating parameters, to the master controller subsystem and the master controller subsystem generates behavior commands (commands which apply to the apparatus as a whole). The control-point controller subsystem generates control-point commands (commands which effect only the specific control points).

The control-point controller subsystem comprises a plurality of control-point processors, which are capable of receiving the behavior commands from the master controller subsystem and generating the control-point commands so as to cause individual control points to effectuate the behavior commands. Included in the control-point controller subsystem are a plurality of control-point processors, which generate the commands; a plurality of control-point interfaces, which translate the commands into a format which actuates the control points on the apparatus; and a cross-bar, which connects the various control-point processors to the various interfaces.

Because the master controller comprises an odd number of master processors (at least three), each running the same program in parallel, the master controller subsystem is robust with respect to processor faults. The outputs of these processors are compared in a voting network to determine which master controller processor output is common to the majority of processors and to output the output common to the majority as the majority control output. Because the probability of two or more processors having identical faults is negligible, this majority control output is an inherently reliable output.

The control-point controller subsystem is made robust by using a redundancy of control-point processors in the subsystem. If one control-point processor develops a fault, the master controller, having detected the fault through conventional means, assigns one of the redundant processors to the control point previously controlled by the failed control-point processor. The master controller subsystem then signals the programmable crossbar switch to disconnect the data path from the faulty control-point processor to the control point it controls and connects the reassigned redundant control-point processor in its place. This assignment of functioning control-point processors is accomplished dynamically without interrupting system operation.

Thus, the instant invention provides a control system and method for utilizing the control system that includes: a host terminal acting as a user interface; a plurality of control-point actuators, a master controller subsystem which receives initialization data from the host terminal and which generates behavior commands, a control-point controller subsystem which receives behavior commands from the master controller and generates control-point actuator commands, and a plurality of control-point interfaces which transmit control-point actuator commands from the control-point to the control-point actuators. The control-point controller is made fault tolerant by using a plurality of control-point processors connected to the control-point interfaces through a programmable crossbar switch such that if any of the control-point processors develops a fault, the crossbar switch will connect one of the other control-point processors to the control-point interface previously serviced by the faulty control-point processors.

DESCRIPTION OF THE FIGURES

FIG. 1 is a block diagram of one embodiment of the control system as given by the instant invention.

DETAILED DESCRIPTION OF THE INVENTION

The following terms, as used herein, are defined as follows: A "fault" is an event occurring in a logic circuit that causes the actual output of the device to differ from the desired output; typical faults include, but are not limited to, signal lines being stuck at a particular value. "Robustness" is the quality of an electronic system that allows the system to continue operating correctly in spite of the presence of a fault within the circuitry of the system. A "control point" is a place on an apparatus having a motive device where, if a specific signal is applied to the actuator for the motive device, some predetermined action by the apparatus is effectuated. Examples include, but are not limited to, robot arm joints. A "crossbar" is an electronic switch capable of logically connecting any of the inputs to the switch to any of the outputs from the switch.

In a preferred embodiment, as seen in FIG. 1, the basic architecture of control system 10 includes: a host system 12 for generating initialization commands, a master controller subsystem 14 for generating various apparatus behavior commands, a control-point controller subsystem 16 for implementing the behavior commands, and a multiple control-point apparatus 18.

The host system-generated initialization commands involve downloading operating programs from the host system 12 into the master controller subsystem 14 and causing the master controller subsystem to begin operation. The host system 12 also allows the operator to dynamically change the operational characteristics of the controller during run time. The host subsystem 12 is connected to the master controller subsystem 14 by a suitable computer interface 20, such as a VMEbus using an IMS B011 Transputer VMEbus board to interface with a SUN computer host.

The master controller subsystem 14 comprises an odd numbered plurality of master processors 22a-22c connected to a voting network 24 via serial data links 26a-26c. The voting network 24 determines which master-processor output is common to the majority of master processors 22a-22c by comparing the data streams, such as a bit-by-bit comparison or a comparison of outputed pieces of information, and transmits this majority master-processor output to the control-point controller subsystem 16 via serial data links 28a-28f. This voting feature makes the master-controller subsystem 14 inherently robust with respect to master-controller processor faults because the probability of the majority of master-controller processors 22a-22c sharing a common fault is extremely low.

There are various ways for the master controller subsystem 14 to sense a control-point processor fault. These include, but are not limited to, communication acknowledgement time outs, improper communications, and incorrect system response. An embodiment of this invention can use one or all of these methods to detect faults.

The master-controller generated behavior commands, the majority output from the master controller, are general to the entire system being controlled. These commands inherently involve a complex combination of movements of the various control points. For example, a command to a robot arm to pick up an object would be a master-controller generated behavior command.

The control-point controller subsystem 16 comprises a plurality of control-point processors 30a-30f, such as high speed transputers, connected to a programmable crossbar switch 32, such as a high speed link switch, via high speed serial data links 34a-34f, and a plurality of control-point interfaces 38a-38e connected to the programmable crossbar 32 by high speed serial data links 40a-40c. The control-point interfaces 38a-38e translate the control-point actuator commands, which are output from the control-point processors 30a-30f in digital form, into analog signals, which are received by control-point actuators 36a-36e and used to effectuate the actual movement of the multiple control-point apparatus 18. The interfaces 38a-38c also receive feedback information (position signals) in either digital or analog format from the control point actuators 36a-36c via signal channels 42a-42c and, if necessary, translate this feedback into digital signals, which are processed by the control-point processors 30a-30f.

In particular, the control-point interfaces 38a-38e translate the digital format actuator commands coming from the control point processors 30a-30f via the programmable crossbar 32 into analog format actuator signals sent to the control-point actuators 36a-36e via signal channels 42a-42e. The control-point interfaces 38a-38e also receive position signals, such as digital or analog format position signals, from the control-point actuators 36a-36e via analog signal channels 42a-42e, and, if necessary, translate the position signals into digital format information packets and send the information packets to the control-point controllers 30a-30f via the programmable crossbar 32.

The control-point controller subsystem 16 has at least one more control-point processor 30a-30f than the number of control-point actuators 36a-36e on the multiple control-point apparatus 18. This redundancy provides for robustness. If one of the control-point processors 30a-30f develops a fault, a redundant processor will be assigned to control-point previously controlled by the faulty processor by the programmable crossbar 32, thus making the system inherently robust with respect to control-point controller faults.

The various behavior commands are processed by the control-point processors 30a-30f to produce control-point actuator commands. Each control point actuator is assigned to at least one control-point processor. The control-point actuator commands generated by the control-point controller subsystem 16 specify the individual movements that must be made by each control point in order for a particular behavior to be completed.

Considering the robot arm example, if the behavior command is to pick up an object, then the control-point controller assigned to the shoulder-like joint could generate the actuator command "swing right 20°", the control-point controller assigned to the elbow-like joint could generate the actuator command "down 35°"; and the control-point controller assigned to the hand-like joint could generate the actuator command "close gripping surface by 25 cm". This translation of the behavior command into actuator commands would cause the shoulder-like joint and the elbow-like joint to swing the robot arm so that the arm is aligned with the object and then close the hand-like joint around the object so that it grips the object.

The multiple control-point apparatus 18 comprises a plurality of members 44a-44d connected to motive devices (not shown) at the control points, which devices are actuated by plurality of control-point actuators 36a-36e. The control-point actuators consist of controllable switches (not shown), which turn the motive devices "off" and "on", and position indicating sensors (not shown), which sense the position of the apparatus members 44a-44d and output position signals to the control-point interfaces 38a-38e via signal channels 42a-42e. The motive devices, which create the motion in the apparatus, can be electric motors, pneumatic rubbertuators, or the like.

In the robot arm example, if the desired behavior command was to pick up an object, the elbow-like joint control-point controller might send an actuator command to extend the joint down by 35°. The control-point interface might translate this actuator command to an analog signal which turns the "down" switch on the elbow motor "on" for 4.2 seconds and turns "up" switch "off". The control-point actuator would then turn on the elbow motor, running in the down direction, for 4.2 seconds to effectuate a 35° downward movement in the elbow-like joint of the robot arm.

The fault tolerant control system of this invention is fast and flexible. Because each control point actuator is controlled by at least one distinct control-point processor 30a-30f, the control-point actuation commands are processed simultaneously rather than sequentially, allowing all of the control points to operate together. Furthermore, if one wants to add an additional control point to the controlled apparatus, one needs only to add an additional control-point controller to the system rather than rewrite the entire software package driving the system.

The control system of this invention can be used in a method for actuating a multiple control-point apparatus. This method involves using a host terminal to initialize the system by downloading initialization data to a master controller subsystem. This method further involves generating fault tolerant behavior commands using the master controller subsystem and transmitting these behavior commands to a control-point controller subsystem, which generates and transmits fault tolerant actuator commands to the control point actuators.

In particular, the behavior commands are made fault tolerant by using an odd number of at least three master processors in the master controller subsystem. The outputs of these processors are compared and the output common to the majority is sent to the control-point controller subsystem as behavior commands.

The next step involves interpreting the behavior commands using the control-point controller subsystem so as to generate control-point actuator commands that are fault tolerant. The control-point controller subsystem is made fault tolerant by using a redundancy of processors. Thus, when the master controller subsystem detects a fault in one of the control-point controllers, the master controller reprograms the crossbar, disconnecting the faulty processor from the interface assigned to the faulty processor and connects one of the redundant processors to the interface previously assigned to the faulty processor. For instance, if the master controller subsystem does not receive an acknowledgement to a behavior command from the control-point controller subsystem, the master controller subsystem recognizes that there is a fault in one of the control-point controller processors. The master controller subsystem determines which control-point processor is faulty by, for instance, polling all of the control-point processors or detecting which control-point processor is replying to the message sent to it, to determine which control-point processor is failing to acknowledge the master controller, and connects one of the redundant processors in place of the faulty processor.

The fault tolerant actuator commands are transmitted to the control-point actuators on the multiple control-point apparatus, which in turn activate the motive devices to allow the apparatus to move at the various control points. For instance, the actuator commands typically are translated from digital to analog format commands via an appropriate interface. Further, the master controller subsystem, in generating the behavior commands, and the control-point subsystem, in generating the actuator commands, utilize feedback information, such as position signals, from the control-point actuators via their interfaces and the control-point subsystem.

The present invention is more particularly described in the following example, which is intended as illustrative only since numerous modifications and variations therein will be apparent to those skilled in the art.

EXAMPLE

One embodiment of the subject invention involves a control system for a robot and a method for controlling the robot. In particular, the Soft Arm robot, which is a pneumatically actuated robot developed by the Bridgestone Corporation of Japan, can be used. The Soft Arm utilizes rubbertuators, which consist of a rubber tube covered with a sleeve of inter-twined fiber cord with metal fittings affixed to both ends of the tube. Increasing air pressure in a rubbertuator makes it contract in length and expand in width. Rubbertuators generate force only when they contract and only in the direction of that contraction and allow manipulation of the robotic arm in much the same way as human muscles manipulate the human arm. The circumference of the rubbertuators decreases during expansion and increases during contraction, adding to the robot's similar physical appearance to the human arm.

Two rubbertuators can be used in a robot to form one degree of freedom. Suppose that the initial pressures in both rubbertuators are $P_0$. Then, if $+\Delta P$ is the pressure applied to one of the rubbertuators, and $-\Delta P$ is applied to the other, rotation can be obtained in proportion to $\Delta P$ in the direction of $+\Delta P$. The equation of motion of the rubbertuator joint can be described by $$J\theta'' + C\theta' + k_1\theta = k_2\Delta p$$

where J is the moment of inertia, $\theta$ is the angle of rotation around the joint, C is the equivalent coefficient of viscosity, and $k_1$ and $k_2$ are proportional constants.

The Soft Arm can be controlled by the instant control system as follows: Each joint has a control point actuator, such as a pneumatic valve associated with it which acts as a control point actuator. Each valve is controlled by a current signal (4–20 mA) that is generated from an 8-bit output port from the control-point processor and passes through a digital to analog convertor (DAC), which is part of a control-point interface. The valve has an internal servo controller that controls the pressure in the rubbertuator according to the current signal. The position of the joint is sensed using an optical incremental encoder which generates two square waves that are out of phase by 90° as the joint moves. The decoder can then generate an absolute value of the position of the joint. A third signal is generated by the encoder that indicates a reference position of the joint. The resolution of the position sensor is 12 bits.

Transputers can be employed as master controller and control-point processors. A transputer is a parallel microprocessor, generally categorized as a Multiple Instruction Multiple Data (MIMD) computer. Transputers can be used to execute different operations on separate data at the same time. The transputer architecture directly implements the process model of concurrency to describe parallel systems. The transputer is highly integrated processor, requiring a minimum of support circuitry. For instance, a parallel processor can be constructed using only a transputer chip, a 5 MHz clock and a 5 Volt power supply.

A typical member in the transputer product family is a monolithic device containing an integer processor, fast memory and multiple serial communication links, which provide point-to-point connection between transputers. Link communications run simultaneously with processor computation to maximize the performance of the system. Each link carries information bidirectionally on 2 wires between one pair of transputers in a computing network.

For instance, IMMOS transputers can be used for the master controller processors and for the control-point processors of the instant invention. This type of transputer is a family of 16 and 32-bit single-chip microcomputers that have their own local memory and communication links. These transputers operate as processing elements interconnected by their links to form a computing array.

The IMS T800 links support the standard INMOS communication speed of 5, 10 and 20 Mbits/sec. Link communication is not sensitive to clock phase. Thus, communication is achieved between independently clocked systems as long as the communication frequency is the same. Each message is transmitted as a sequence of single byte communications, requiring only the presence of a single byte buffer in the receiving transputer to insure that no information is lost. Each byte is transmitted as a start bit followed by a one bit followed by the eight data bits followed by a stop bit. After transmitting a data byte, the sender waits until an acknowledge is received; this consists of a start bit followed by a zero bit.

Thus, the control system may comprise a transputer-based parallel controller, which consists of two hardware modules, the transputer boards and the interface boards. The modules are connected through the INMOS high speed serial links to allow the interface board to be connected to any other transputer network on any other host computer including, but not limited to, a personal computer.

The transputer network contains the master controller processors and the control-point processors, which can be connected to a SUN workstation, acting as a host system, via the INMOS serial link. To connect the network to the SUN through the serial link, a transputer board is installed inside the SUN that interfaces a transputer with the SUN through the VMEbus, using an IMS B011 Transputer VMEbus board manufactured by INMOS. This transputer is used to download programs to different transputers in the network. Another transputer board, which houses the master-controller subsystem processors, can also be connected to the IMS B011 board. For instance, an NSC EB8-10 board, which contains eight T800 transputers, preferably only three of which are used, with 1 Mbyte of external RAM can be used.

Another transputer board, such as the TBE02 board, can be connected to the NSC EB8-10 through the serial links to provide for the control-point processors in the control-point controller subsystem. The TBE02 board contains eight T800 transputers connected serially. Each transputer has 1 Mbyte of external RAM and there are two free links available for each transputer. These links can be connected to the IMS C004 link switch to provide a programmable link switch which can connect any link to any control point. The IMS C004 link switch is a full crossbar switch with between 32 links inputs and 32 links outputs and can be configured dynamically to connect the links. Thus, the IMNOS C004 programmable link switch can be used as the programmable crossbar.

The programmable link switch can be programmed via a separate link from the master controller subsystem. A set of configuration messages are used to define the connection of different links together or to enquire about a connection of a certain link. At the initialization of the controller, the link switch is configured using one of the transputer links in the NSC EB8-10 board. Having a dynamically configurable link switch provides the fault tolerance in the control-point controller subsystem since a faulty transputer can be isolated from the interface board and replaced by another transputer during the operation of the controller.

The interface board allows each transputer to control a corresponding control point of the Soft Arm. Each transputer is connected to an interface board that accesses one control point. Each control point uses two current signals (4–20 mA) to set the pressure in the rubbertuators and a digital (12-bit) input signal for the position of the joint axis. The board is connected to the transputer via the INMOS high speed serial link operating at 10 Mbit/sec. The links are connected to two IMS C011 link adapters operating as input/output ports. Each link adapter has eight-bit input and output ports. One of the link adapters is used to transfer data and the other link adapter is used to control the transfer operation.

The transputers can use the message passing algorithm in data transfer. The node sending data to another node will be blocked until that data is received by the other node. The same principle applies in the link adapter. The link adapter uses handshakes to acknowledge the transfer of data. The output port handshakes are connected together, so whenever data is sent to an output port, the handshake lines will automatically acknowledge the reception of the data. This allows the transputer to send data to the output port without waiting for any external device to receive it. Using this technique, the data output port sends data to an 8-bit dual channel Digital to Analog Converter (DAC), the TLC7528 of the control-point interface. The DAC has an internal 8-bit latch that holds the digital value for each channel. In the control-point interface, analog voltage signals are transformed into 4–20 mA current signals using LM 324 operational amplifier circuits. These current signals are used to drive the servo valve that controls the pressure in the rubbertuators.

In the preferred embodiment, all the controller software is written in C language. The programs are compiled and then loaded to the transputers, through the EXPRESS programming environment. Each transputer has its own program in this local memory. Programs can be divided into two main categories: the master node program and control-point controller nodes programs.

Although the present apparatus and process has been described with reference to specific details of certain embodiments thereof, it is not intended that such details should be regarded as limitations upon the scope of the invention except as and to the extent that they are included in the accompanying claims.

What is claimed is:

1. A control system for rapid fault tolerant control of a multiple control-point apparatus, comprising:
   a. a host subsystem acting as a user interface;
   b. a plurality of control-point actuators, wherein the control-point actuators are located on or within the multiple control-point apparatus;
   c. a master controller subsystem, which receives initialization data from the host subsystem and generates apparatus behavior commands;
   d. a control-point controller subsystem, which receives apparatus behavior commands from the master controller subsystem and generates control-point actuator commands, comprising:
      i) a plurality of control-point processors, wherein each control-point processor receives the behavior commands addressed to it and generates control-point actuator commands corresponding to the behavior commands;
      ii) a plurality of control-point interfaces, which transmit control-point actuator commands generated by the plurality of control-point controllers to the plurality of control-point actuators and transmit control-point position information from the plurality of control-point actuators to the plurality of control-point controllers for use in generating control-point actuator commands; and
      iii) a programmable crossbar switch capable of connecting any control-point processor to any control-point interface, so that if any one control-point processor develops a fault, the crossbar switch will connect another control-point processor to the control-point interface previously controlled by the faulty control-point processor.

2. The control system of claim 1, wherein the master controller subsystem further comprises:
   a. an odd number of at least three master processors, wherein each master processor runs a common control program in parallel with every other master processor and wherein each generates a master control output; and
   b. means for generating a majority control output, comprising:
      i) means for determining which master control output is common to the majority of master processors to identify the majority control output; and
      ii) means for outputting the majority control output.

3. The control system of claim 2, wherein said master processors are high speed transputers.

4. The control system of claim 1, wherein the number of control-point processors is at least one in excess of the number of control-point interfaces such that if the master controller subsystem detects a failure in one of the control-point processors, the programmable crossbar will connect one of the excess control-point processors to the control-point interface previously connected to the failed control-point processor.

5. The control system of claim 1, wherein the control-point interface further comprises:
   a. a plurality of serial-to-parallel converters for converting the control-point actuator commands from a serial data stream into parallel data command packets;
   b. a plurality of digital-to-analog converters for converting parallel data command packets into analog control-point actuator command signals;
   c. a plurality of position encoders for generating position signals which quantify the position of the apparatus being controlled; and
   d. a means for transmitting the position signals to the control-point controller processors.

6. The control system of claim 1, wherein the multiple control-point apparatus is a robotic device or robot arm.

7. The control system of claim 1, wherein said control-point processors are high-speed transputers.

8. The control system of claim 1, wherein said programmable crossbar switch is a high-speed link switch.

9. The control system of claim 1, wherein the host subsystem is a terminal selected from the group consisting of a personal computer and an intelligent workstation.

10. A fault tolerant method for actuating a multiple control-point apparatus using the control system of claim 1, comprising the steps of:
    a. initializing the master controller subsystem using the host subsystem;
    b. generating fault tolerant behavior commands using the master controller subsystem and transmitting the fault tolerant behavior commands to the control-point controller subsystem;
    c. generating fault tolerant control-point actuator commands using the control-point controller subsystem;
    d. transforming the fault tolerant control-point position actuator commands from the format generated by the control-point controller into the format acceptable to the control-point actuators by using a plurality of control-point interfaces; and
    e. transmitting the fault tolerant control-point actuator commands to the control-points of the apparatus so as to actuate the control-points actuators on or within the apparatus.

11. The method of claim 10, wherein the master controller subsystem comprises a plurality of master processors.

12. The method of claim 10, wherein the control-point interfaces transform the control-point actuator commands by converting the control point actuator commands from a serial data stream to parallel command packets and converting the command packets into analog control-point actuator signals.

13. The method of claim 10, wherein the master controller subsystem comprises an odd number of master processors and outputs the output common to the majority of master processors as the fault tolerant behavior commands.

14. The method of claim 10, wherein the number of control-point processors is at least one in excess of the number of control-point interfaces such that if the master controller subsystem detects a failure in one of the control-point processors, the crossbar will connect one of the excess control-point processors to the control-point interface previously connected to the failed control-point processor so as to provide fault tolerant control-point actuator commands.

15. The method of claim 10, wherein the apparatus is a robotic device or a multiple jointed robot arm.

16. In a control system for rapid fault tolerant control of a multiple control-point apparatus, comprising a host subsystem acting as a user interface; a plurality of control-point actuators, wherein the control-point actuators are located on or within the apparatus; a master controller subsystem which receives initialization data from the host terminal and generates apparatus behavior commands; a control-point controller subsystem which recieves apparatus behavior commands from the master controller subsystem and generates control-point actuator commands; and a plurality of control-point interfaces which transmit control-point actuator commands from the control-point controller to the plurality of control-point actuators and transmits control-point position information from the plurality of control-point actuators to the control-point controller subsystem for use in generating control-point actuator commands, the improvement comprising:
   a. means for providing apparatus behavior commands that are fault tolerant, comprising:
      i) an odd number of at least three master processors located in the master controller subsystem, wherein each master processor runs a common control program in parallel with every other master processor and wherein each master processor generates a master control output; and
      ii) means for generating a majority master control output, comprising:
         A) means for determining which master control output is common to the majority of master processors to identify the majority control output; and
         B) means for outputting the majority control output; and
   b. means for providing control-point actuator commands that are fault tolerant, comprising:
      i) a plurality of control-point controller processors located in the control-point controller subsystem, wherein each control-point processor receives the behavior commands addressed to it and generates control-point actuator commands; and
      ii) a programmable crossbar switch capable of connecting any control-point processor to any control-point interface.

* * * * *

UNITED STATES PATENT AND TRADEMARK OFFICE
CERTIFICATE OF CORRECTION

PATENT NO. : 5,285,381

DATED : February 8, 1994

INVENTOR(S) : Moenes Iskarous, et al

It is certified that error appears in the above-indentified patent and that said Letters Patent is hereby corrected as shown below:

Column 8, line 16, delete the term "IMNOS" and insert therefor --INMOS--.

Signed and Sealed this

Twenty-third Day of August, 1994

Attest:

BRUCE LEHMAN

Attesting Officer — Commissioner of Patents and Trademarks